Patented Apr. 3, 1934

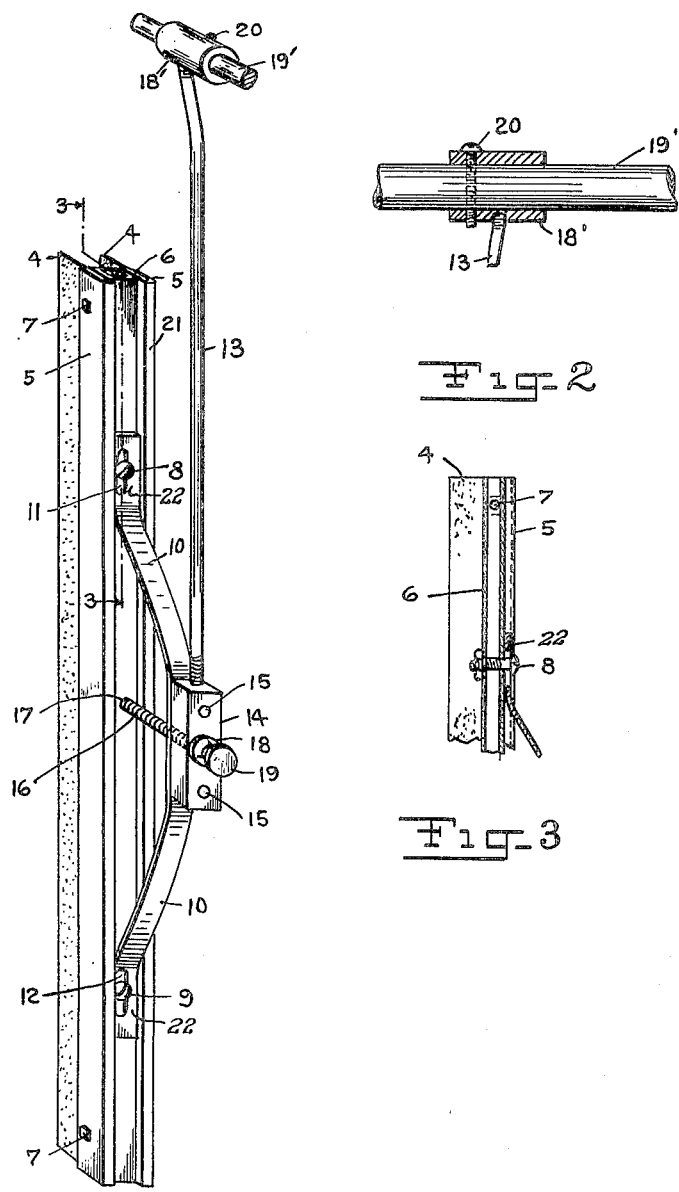

1,953,635

UNITED STATES PATENT OFFICE 1,953,635

WINDSHIELD WIPER

Robert N. Rose and Henry G. Stein, Queens Village, N. Y.

Application May 2, 1931, Serial No. 534,650

3 Claims. (Cl. 15—250)

Our invention relates to improvements in windshield wipers, and more particularly, has reference to a wiper of the class described, which is automatically adjustable to unevennesses in the glass, and which permits of adjustment of tension, and provides a double wipe to insure thorough cleaning of the glass. The wipers are removable and renewable, and the arm is substantially rigid, thus providing greater certainty of operation, while at the same time allowing the wiper to rock and adjust itself upon the arm when cleaning.

Referring to the accompanying drawing, we have illustrated in Fig. 1 in perspective a suitable form of wiper embodying an application of our invention. Fig. 2 is a longitudinal section on an enlarged scale illustrating the mounting of the arm upon the motor spindle, and Fig. 3 is a longitudinal sectional detail on the line 3—3 of Fig. 1.

The wipers consist preferably of several strips of rubber, or other suitable material 4, retained in a U-shaped metal back 5, between which may be secured a square tube 6, suitable small bolts or rivets 7 passing through for holding the combination in position. The top of the square tube 6 is preferably drilled and tapped at two points to receive the screws 8, 9, beneath the heads of which is slidably secured the ends of the spring 10 by virtue of the elongated holes 11, 12. The arm or rod 13 for oscillating the wiper is of sufficient stock to give substantial rigidity, and is preferably threaded at opposite ends, the lower end entering the block 14, which in turn is secured to the spring 10, preferably by rivets or screws 15. This block 14 is also drilled and tapped transversely to receive the screw 16, having a round or dome-pointed end 17, and a head 19. The screw carries a nut 18 to lock the screw in position in the block 14. The nut may, if desired, be positioned at the under side of the spring 10, if preferable.

The upper end of the arm or rod 13 may be screwed, or otherwise secured, in the hub 18, which in turn slides over the spindle 19 of the vacuum or other motor, and is preferably drilled transversely, likewise the spindle 19, to receive the screw 20, thus securely holding the combination in position.

The square tube 6 is also preferably slightly depressed below the tops 21 of the wiper retaining members 5, and the ends 22 of the spring 10 are seated upon the square tube 6, and between the projecting edges of the retaining portions 5, thus providing a guide-way for slidably mounting the ends 22 of the spring 10.

In operation, the screw 16 is rotated until the desired adjustment of the pressure of the wiper upon the glass is obtained, after which the nut 18 may be set against the block 14 to maintain the adjustment. The spring 10 allows the wipers 4 to rock slightly, the dome end 17 of the screw 16 riding upon the outer surface of the square tube 6, and the wipers readily adjust themselves to any unevenness in the surface of the glass, and at the same time bear with sufficient pressure thereon to insure proper cleaning thereof. The wipers may be readily removed by taking out the screws, or portions 7, and inserting new wipers.

Of course, it will be understood that various modifications may be made in the construction and arrangement of parts without departing from the spirit of the invention as claimed.

We claim:

1. In a windshield wiper of the class in which a wiper is oscillated by a substantially rigid arm, the combination of a member attached to the free end of the arm, a screw threaded through the member and contacting with the wiper for adjusting the pressure of the wiper upon the windshield and a spring attached to the member and slidably connected to the wiper.

2. In a windshield wiper of the class in which a wiper is oscillated by a substantially rigid arm, the combination of a member attached to the free end of the arm, a screw threaded through the member and contacting with the wiper for adjusting the pressure of the wiper upon the windshield, and a bowed spring attached at its central portion to the member and having its ends slidably connected to the wiper.

3. In a windshield wiper of the class in which a wiper is oscillated by a substantially rigid arm, the combination of a member attached to the free end of the arm, a screw threaded through the member and contacting with the wiper for adjusting the pressure of the wiper upon the windshield, a bowed spring attached at its central portion to the member and provided with slots in its ends and elements passing through the slots into the wiper, whereby sliding connections are formed between the wiper and the spring.

ROBERT N. ROSE.
HENRY G. STEIN.